US012366216B1

(12) United States Patent
Chandler et al.

(10) Patent No.: US 12,366,216 B1
(45) Date of Patent: Jul. 22, 2025

(54) THRUST REVERSER IN CONDENSER EXIT DUCT

(71) Applicant: RTX CORPORATION, Farmington, CT (US)

(72) Inventors: Jesse M. Chandler, S. Windsor, CT (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/910,173

(22) Filed: Oct. 9, 2024

(51) Int. Cl.
| | |
|---|---|
| *F02K 1/72* | (2006.01) |
| *F02C 3/30* | (2006.01) |
| *F02K 1/76* | (2006.01) |
| *F02C 3/20* | (2006.01) |
| *F02K 3/06* | (2006.01) |

(52) U.S. Cl.
CPC ................. *F02K 1/72* (2013.01); *F02C 3/30* (2013.01); *F02K 1/763* (2013.01); *F02C 3/20* (2013.01); *F02K 3/06* (2013.01)

(58) Field of Classification Search
CPC ... F02K 1/70; F02K 1/72; F02K 1/763; F02K 3/06; F02C 3/20; F02C 3/22; F02C 3/30
See application file for complete search history.

(56) References Cited

U.S. PATENT DOCUMENTS

| | | | |
|---|---|---|---|
| 9,719,465 B2 | 8/2017 | Suciu et al. | |
| 11,286,881 B2 | 3/2022 | Boyd et al. | |
| 11,994,069 B2 | 5/2024 | Corbin et al. | |
| 12,163,488 B1* | 12/2024 | Sobanski | F02C 7/18 |
| 2024/0301823 A1* | 9/2024 | Sobanski | F02C 6/18 |

FOREIGN PATENT DOCUMENTS

| | | |
|---|---|---|
| WO | 2023237152 A1 | 12/2023 |
| WO | 2023246980 A1 | 12/2023 |

* cited by examiner

*Primary Examiner* — William H Rodriguez
(74) *Attorney, Agent, or Firm* — Carlson, Gaskey & Olds, P.C.

(57) ABSTRACT

An aircraft propulsion system includes a thrust reverser assembly that includes a reverser door corresponding to a cooling air outlet duct for directing a cooling air flow from a condenser forward.

20 Claims, 11 Drawing Sheets

THRUST REVERSER IN CONDENSER EXIT DUCT

TECHNICAL FIELD

The present disclosure relates generally to a thrust reverser for a gas turbine engine, and more particularly to a thrust reverser for a gas turbine engine including an evaporator and condenser arrangement.

BACKGROUND

An aircraft propulsion system typically includes a gas turbine engine with a fan section, a compressor section, a combustor section, and a turbine section. Air entering the compressor section is compressed and delivered into the combustion section where it is mixed with fuel and ignited to generate a high-energy exhaust gas flow. Some energy in the high energy exhaust flow is recovered as it is expanded through a turbine section. A large amount of energy is lost in the form of heat that is simply exhausted from the turbine section to the atmosphere. Steam injection can provide improved propulsive efficiencies. Water recovered from the exhaust gas flow may be transformed into steam using thermal energy from the exhaust gas flow in an evaporator. Thermal communication between the exhaust gas flow and recovered water may require relatively large heat exchangers that present challenges for incorporation into engine configurations including thrust reversers.

SUMMARY

An aircraft propulsion system according to an exemplary embodiment of this disclosure, among other possible things includes a core engine that includes a compressor, combustor, and turbine section, an inlet airflow that is compressed and communicated to the combustor, mixed with fuel, and ignited to generate an exhaust gas flow that is expanded through the turbine section, a fan that is driven about a propulsor axis by the core engine, a nacelle assembly, a condenser assembly where water is condensed from the exhaust gas flow generated by the core engine, the condenser assembly includes a condenser arranged in the nacelle and a corresponding cooling air outlet ducts where inlet air is directed for cooling the exhaust gas flow, an evaporator system where heat from the exhaust gas flow is used to transform water from the condenser assembly into a steam flow for injection into the core engine, and a thrust reverser assembly that includes a reverser door corresponding to the cooling air outlet ducts for reversing a direction of a cooling air flow from the condensers forward.

In a further embodiment of the foregoing aircraft propulsion system, the reverser door defines a radial outer portion of the cooling air outlet ducts.

In a further embodiment of any of the foregoing aircraft propulsion systems, the reverser door includes a forward portion, an aft portion, and a pivot that is positioned to provide for the aft portion to substantially close the cooling air outlet ducts and move the forward portion radially outward to define a reverser opening.

In a further embodiment of any of the foregoing aircraft propulsion systems, the condensers include an inlet face and an outlet face for the cooling air flow and an inlet flow path through the condenser is transverse to the propulsor axis and an outlet flow path through the cooling air outlet ducts is perpendicular to the outlet face of the condenser.

In a further embodiment of any of the foregoing, the aircraft propulsion system further includes an actuator that is coupled to the reverser doors for moving the reverser door from a closed position where the cooling air flows through the cooling air outlet duct and an open position where the cooling airflow is directed forward.

In a further embodiment of any of the foregoing aircraft propulsion systems, the reverser door is circumferentially aligned with the condenser.

In a further embodiment of any of the foregoing, the aircraft propulsion system further includes an inner duct door corresponding to the cooling air outlet ducts. The inner duct door is movable to direct a portion of a bypass air flow radially outward and a portion of the reverser door extends radially inward of the condenser outlet ducts into a bypass passage and against a portion of the inner duct door for redirecting at least a portion of a bypass airflow forward along with the exhaust gas flow.

In a further embodiment of any of the foregoing, the aircraft propulsion system includes a cooling air duct assembly where a portion of inlet airflow is communicated to the condenser.

In a further embodiment of any of the foregoing, the aircraft propulsion system further includes water separators where water from the condenser is separated from the exhaust gas flow.

In a further embodiment of any of the foregoing aircraft propulsion systems, the turbine section of the core engine is engine forward of the combustor and the compressor section and an inlet duct assembly communicates a portion of the inlet airflow to an inlet that is disposed aft of the compressor section.

In a further embodiment of any of the foregoing, the aircraft propulsion system further includes a power turbine that is coupled to drive the propulsor. The power turbine is disposed engine forward of the core engine.

A gas turbine engine according to another exemplary embodiment of this disclosure, among other possible things includes a core engine that includes a compressor, combustor, and turbine section, an inlet airflow is compressed and communicated to the combustor, mixed with fuel, and ignited to generate an exhaust gas flow that is expanded through the turbine section, a fan that is driven about a propulsor axis by the core engine, a nacelle assembly, a fan case that is disposed within the nacelle assembly at least partially surrounding the fan, a condenser assembly where water is condensed from the exhaust gas flow generated by the core engine, the condenser assembly includes a condenser that is arranged in the nacelle, a corresponding condenser outlet duct, and a water separator where water from the condenser assembly is separated from the exhaust gas flow, an inlet duct defines a flow path for the exhaust gas flow to the condenser, an evaporator system where heat from the exhaust gas flow is used to transform water from the condenser assembly into a steam flow for injection into the core engine, a bypass passage that includes a portion radially inward of the condenser outlet ducts, and a thrust reverser assembly that includes a reverser door corresponding to the condenser outlet duct for reversing a direction of a cooling air flow from the condenser forward.

In a further embodiment of the foregoing gas turbine engine, the reverser door defines a radial outer portion of the condenser outlet duct and includes a forward portion, an aft portion, and a pivot positioned to provide for the aft portion to substantially close the condenser outlet duct and move the forward portion radially outward to define a reverser opening.

In a further embodiment of any of the foregoing gas turbine engines, the condenser includes an inlet face and an outlet face for the exhaust gas flow and an inlet flow path through the condenser is transverse to the propulsor axis and an outlet flow path through the condenser outlet duct is perpendicular to the outlet face of the condenser.

In a further embodiment of any of the foregoing gas turbine engines, at least one heat exchanger stage includes a first stage and a second stage, and the first stage is downstream from the second stage relative to the exhaust gas flow from the core engine.

In a further embodiment of any of the foregoing, the gas turbine engine further includes an inner duct door movable to direct a portion of a bypass air flow radially outward and a portion of the reverser door extends radially inward of the condenser outlet duct into the bypass passage such that the inner duct door and the reverser door define a passage for redirecting at least a portion of a bypass airflow along with the exhaust gas flow.

In a further embodiment of any of the foregoing, the gas turbine engine further includes an intercooling system where a portion of the water extracted from the exhaust gas flow is utilized to cool a portion of a core airflow.

A method of operating an aircraft propulsion system according to another exemplary embodiment of this disclosure, among other possible things includes generating an exhaust gas flow with a core engine that includes a compressor, combustor, and turbine section, coupling a propulsor to a power turbine that is configured to be driven by expansion of the exhaust gas flow about a propulsor axis by the core engine, condensing water in condenser assembly by cooling a portion of the exhaust gas flow with a cooling air flow with a condenser arranged about the propulsor axis, heating water from the condenser assembly in an evaporator system with at least one heat exchanger stage mounted to a fan case at least partially surrounding a fan coupled to the core engine, communicating the generated steam flow to the core engine, and selectively directing a portion of the cooling airflow exiting the condenser with a reverser door.

In a further embodiment of the foregoing method, the reverser door includes a forward portion, an aft portion, and a pivot positioned to provide for the aft portion to substantially close a condenser outlet duct and move the forward portion radially outward to define a reverser opening and further includes directing the cooling air flow from the condenser forward.

In a further embodiment of any of the foregoing methods, a portion of the reverser door extends radially inward of the condenser outlet ducts into a bypass passage and an inner duct door opens radially to define a passage for redirecting at least a portion of a bypass airflow along with the cooling air flow.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
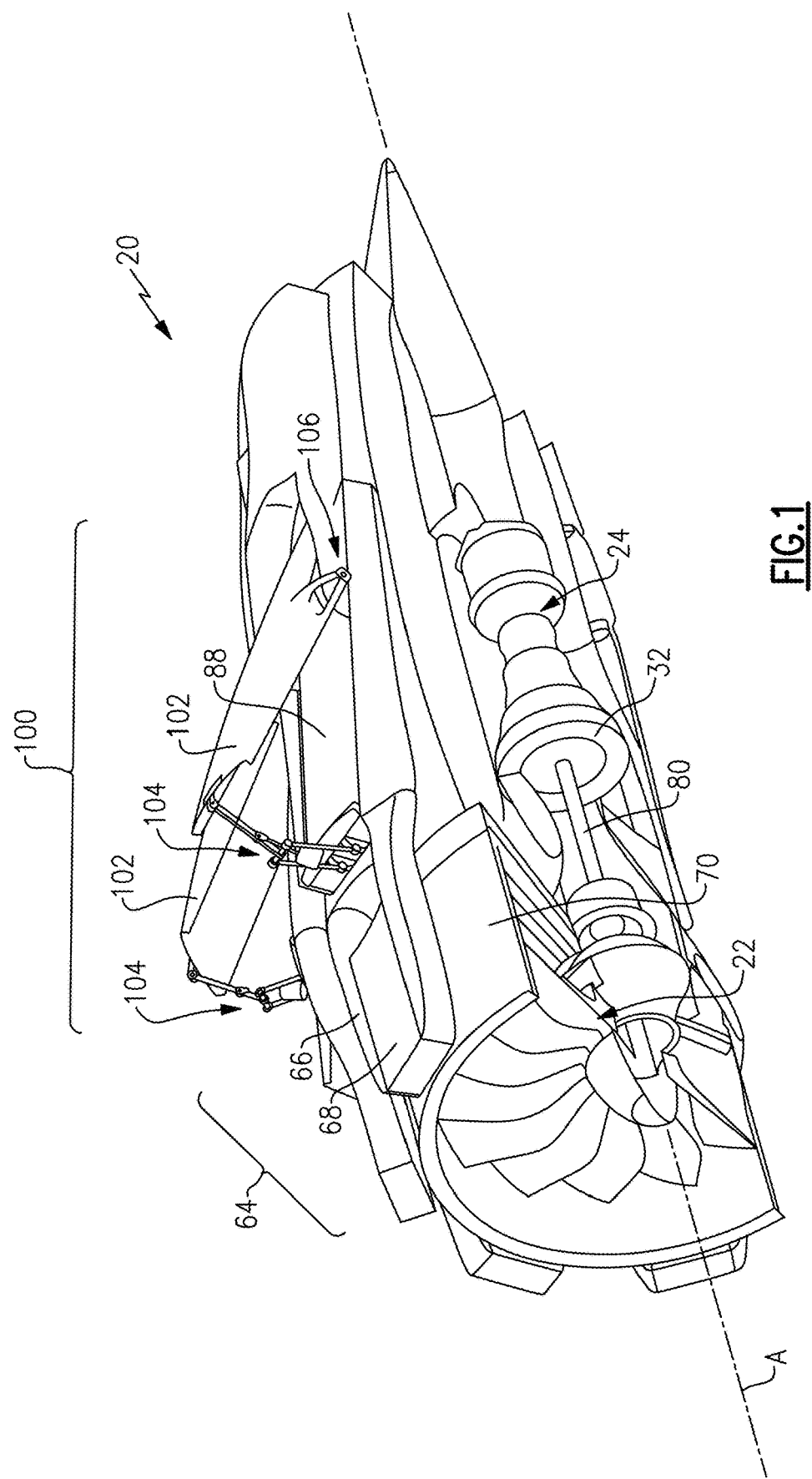
FIG. 1 is a schematic view of an example aircraft propulsion system with a thrust reverser system.
Figure 2:
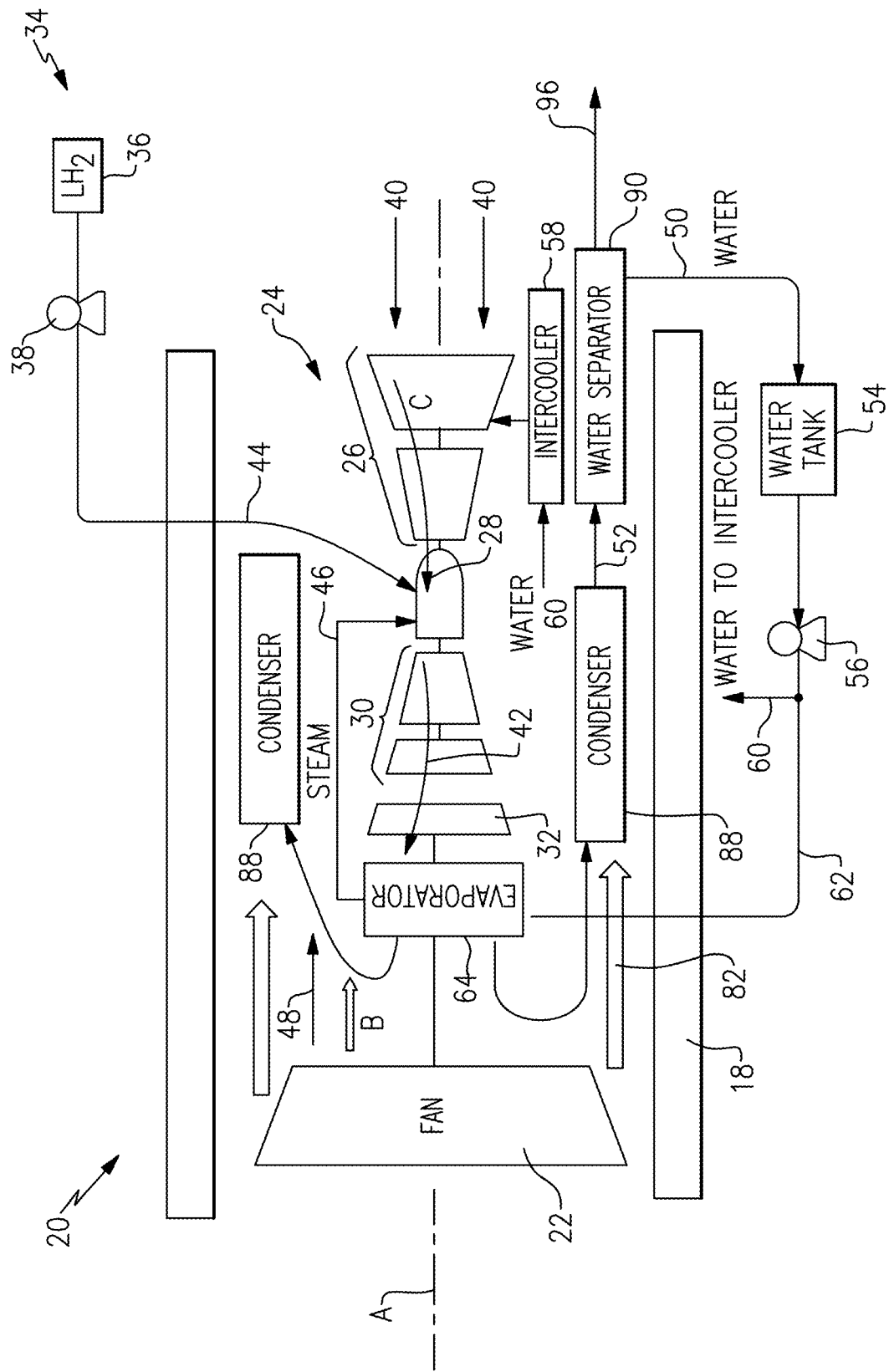
FIG. 2 is a simplified schematic view of the example aircraft propulsion system of FIG. 1.

FIGS. 1 and 2 schematically illustrate an aircraft propulsion system 20 with a thrust reverser system 100 for reversing a direction of cooling air flow through condensers 88 forward. The propulsion system 20 includes a plurality of condensers 88 where an exhaust gas flow is cooled by cooling air flow to extract water that is heated in an evaporator system 64 to generate a steam flow 46 that is injected into a core flow C to improve engine efficiency. A substantial amount of an inlet airflow is used for cooling and routed through the condensers 88. The thrust reverser system 100 directs the exhausted cooling air flow forward to aid in slowing an aircraft.

The aircraft propulsion system 20 includes an evaporator system 64 and plurality of condensers 88 that include heat exchangers that are configured to transfer thermal energy. In the evaporator system 64, thermal energy from the exhaust gas flow 42 is utilized to vaporize water and generate the steam flow 46. In the condensers 88, a cooling air flow 82 is utilized to cool and condense liquid from the exhaust gas flow 42. Evaporation and condensing functions may require large areas of thermal communication. The disclosed evaporator system 64 and condensers 88 provide the large areas for thermal communication in the limited space available within the example propulsion system 20. Moreover, a significant amount of airflow through the fan 22 is routed through the cumulative areas provided by the condensers 88. The example thrust reverser system 100 uses exhausted cooling flow to generate a reversing thrust.

The example propulsion system 20 includes the propulsive fan 22 and a reverse core engine 24. The example core engine 24 includes a compressor section 26, a combustor section 28 and a turbine section 30 disposed along the longitudinal propulsor axis A. The turbine section 30 is disposed engine forward of the combustor 28 and the compressor section 26. A power turbine 32 is arranged forward of the turbine section 30 and drives the fan 22. The power turbine 32 is coupled to drive the fan 22 through a drive shaft 80 and is rotatable independent of structures in the core engine 24. The power turbine 32 is not mechanically coupled to the core engine 24.

The fan 22 drives a bypass airflow 48 along a bypass flow path B, while the compressor section 26 draws an inlet flow 40 into a core flow path C of the core engine 24. The fan 22 and core engine 24 are disposed within a nacelle 18. The inlet flow 40 is compressed and communicated to the combustor section 28 where the compressed inlet flow 40 is mixed with a fuel flow 44 and ignited to generate the exhaust gas flow 42. The exhaust gas flow 42 expands through the turbine section 30 where energy is extracted and utilized to drive the compressor section 26. The exhaust gas flow 42 further expands through the power turbine 32 to drive the fan 22.

In addition to the fuel 44, a steam flow 46 is introduced into the combustor 28. The steam flow 46 may be injected at the combustor 28 or a location upstream of the combustor for communication into the combustor 28. Performance is improved with the injection of the steam flow because the steam flow 46 increases mass flow through the turbine section 30 without additional work required by the compressor section 26.

The steam flow 46 is generated by heating water 50 recovered from the exhaust gas flow 42 in the condenser 88. A cooling flow 82 cools the exhaust gas flow 42 within the condenser 88 to condense water. A mixed water and gas flow 52 are sent through a water separator 90 such that water 50 is communicated to a water tank 54 and a gas flow 96 is exhausted. A pump 56 generates pressurized water flow 62 that is heated in the evaporator system 64 with heat from the exhaust gas flow 42. The steam flow 46 from the evaporator system 64 is injected into the combustor 28.

A fuel system 34 includes at least a fuel tank 36 and a fuel pump 38 to provide the fuel flow 44 to the combustor 28. The example fuel system 34 is configured to provide a hydrogen based fuel such as a liquid hydrogen (LH$_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

The example propulsion system 20 may further include an intercooler 58 for injecting an intercooling water flow 60 into the compressor section 26 to reduce a temperature of the inlet airflow 40 and increase mass flow. Reduced temperatures and increased mass flow provided by injection of water increases compressor efficiency.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. For example, the core engine 24 may be offset from the engine axis A. Additionally, the features of this disclosure may be applied to other engine configurations utilized to generate shaft power.

Figure 3:
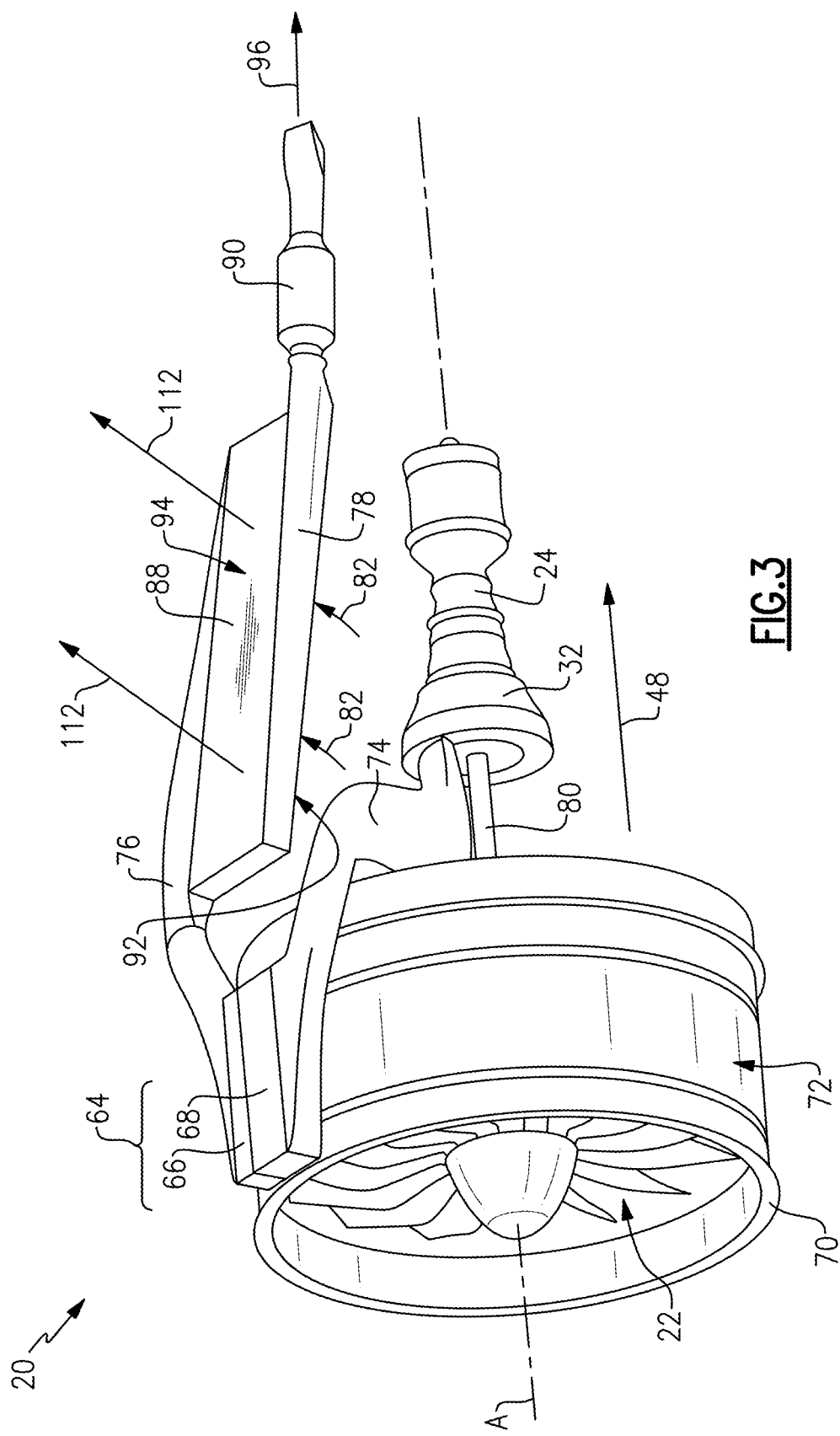
FIG. 3 is another simplified schematic view illustrating portions of a condenser system and evaporator system of the example propulsion system.

Referring to FIG. 3, with continued reference to FIGS. 1 and 2, the power turbine 32 drives the fan 22 through the drive shaft 80. The fan 22 is circumscribed by a fan case 70. A plurality of heat exchangers for the evaporator system 64 are disposed about the fan case 70. Each of the plurality of heat exchangers include a first stage 66 and a second stage 68 mounted to the outer surface 72 of the fan case 70.

Mounting of portions of the evaporator system 64 on the fan case 70 provides for the core engine 24 to be closer to the fan 22 and thereby for the use of shorter drive shaft 80.

The exhaust gas flow 42 is fed to the first and second stages 66, 68 through the exhaust duct assembly 74. Although the example evaporator system 64 is disclosed as including the first stage 66 and the second stage 68, a plurality of single stage heat exchangers could be utilized and is within the contemplation and scope of this disclosure. Moreover, although two stages are shown and described by way of example, other numbers of stages may be used with the example evaporator system 64 and remain with the contemplation and scope of this disclosure.

An inlet manifold 76 directs exhaust gas flow to the condenser 88. In the condenser 88, the exhaust gas flow 42 is cooled to condense water and communicated through an outlet manifold 78 to a water separator 90. The water separator 90 separates water from the gas flow. Water 50 is communicated to the water tank 54 (FIG. 2) and the remaining gas flow 96 is exhausted away from the propulsion system 20.

FIG. 3 illustrates a single leg of the evaporator system 64 and the condensers 88 that defines one of a plurality of flow paths for the exhaust gas flow 42 spaced circumferentially apart about the propulsor axis A. A plurality of legs is arranged about the engine axis A and route the exhaust gas flow 42 to one set of the first and second stages 66, 68 of the evaporator system 64. Although evaporator and condenser systems are shown and described by way of example, the example thrust reverser system 100 may be utilized with other condenser and evaporator systems and remain within the scope and contemplation of this disclosure.

A cooling air flow is routed through each of the plurality of condensers 88. In the example shown in FIG. 3, a cooling airflow 82 is communicated to an inlet face 92 of each condenser 88. Exhausted cooling air flow 112 exits the condenser 88 through an outlet face 94. Cooling air flow 82 through the condenser 88 is radially outward, transverse to the propulsor axis A. Moreover, the size and number of condensers 88 provide for the routing of a significant amount of airflow through the condensers 88. The example thrust reverser system 100 uses the substantial cooling air flow 112 that is turned radially outward to generate forward flows to generate reversing thrust.

Figure 4:
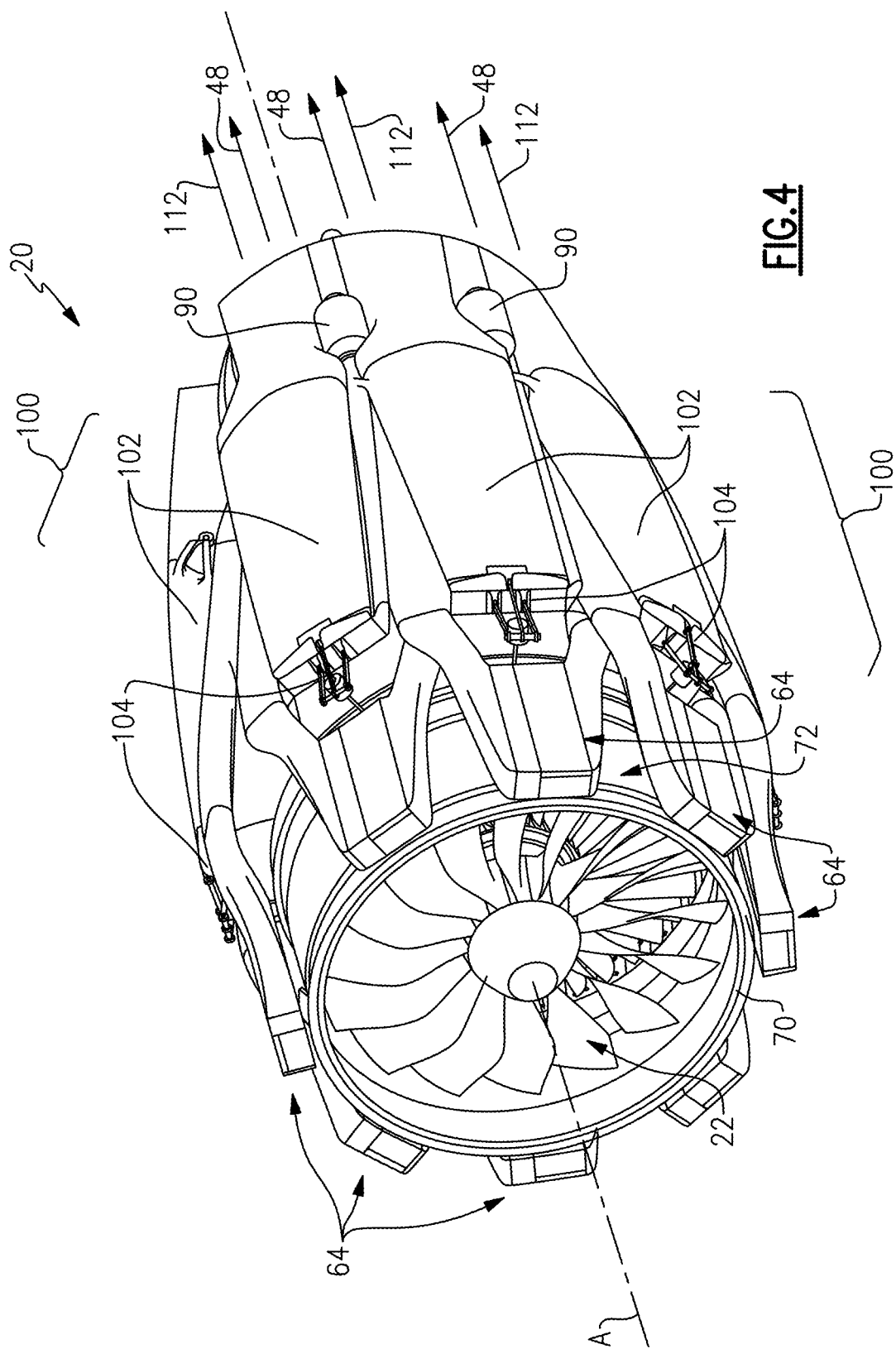
FIG. 4 is a perspective view of the example propulsion system with the thrust reverser system in a closed position.
Figure 5:
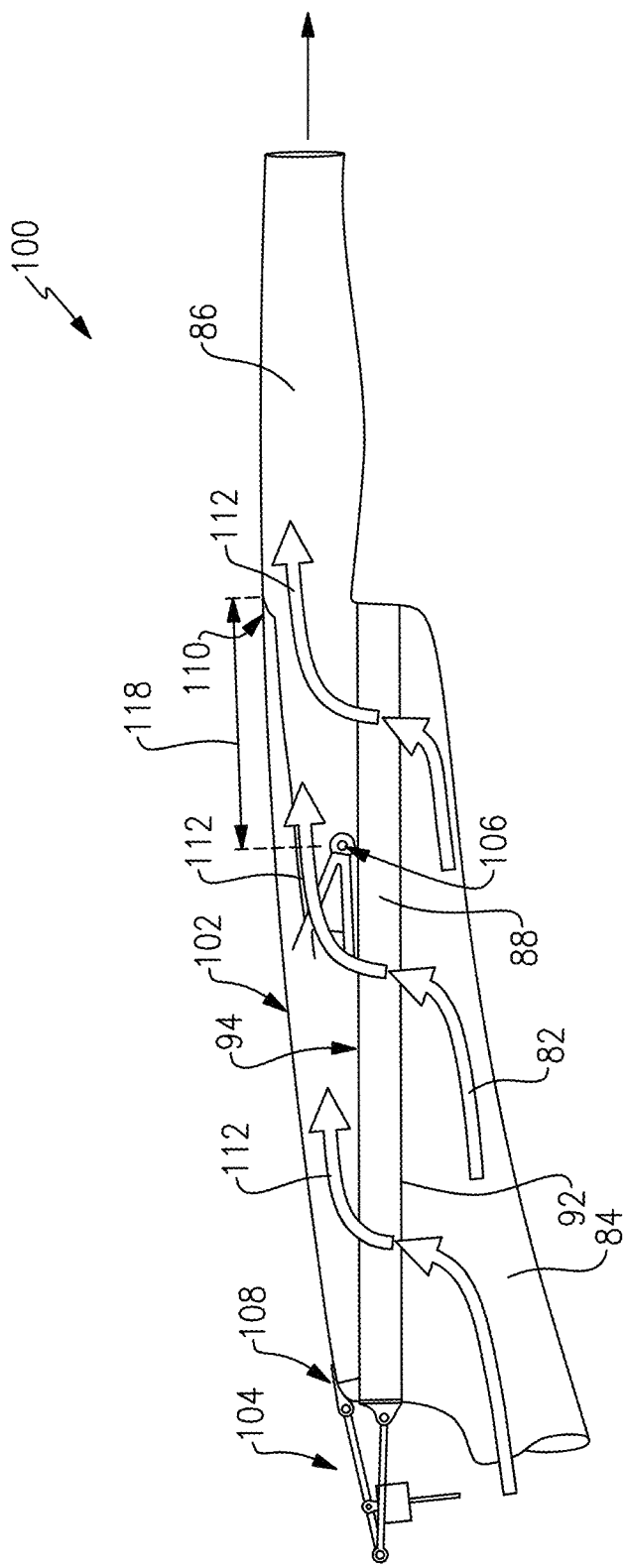
FIG. 5 is a cross-section of a portion of the thrust reverser system in a closed position.
Figure 6:
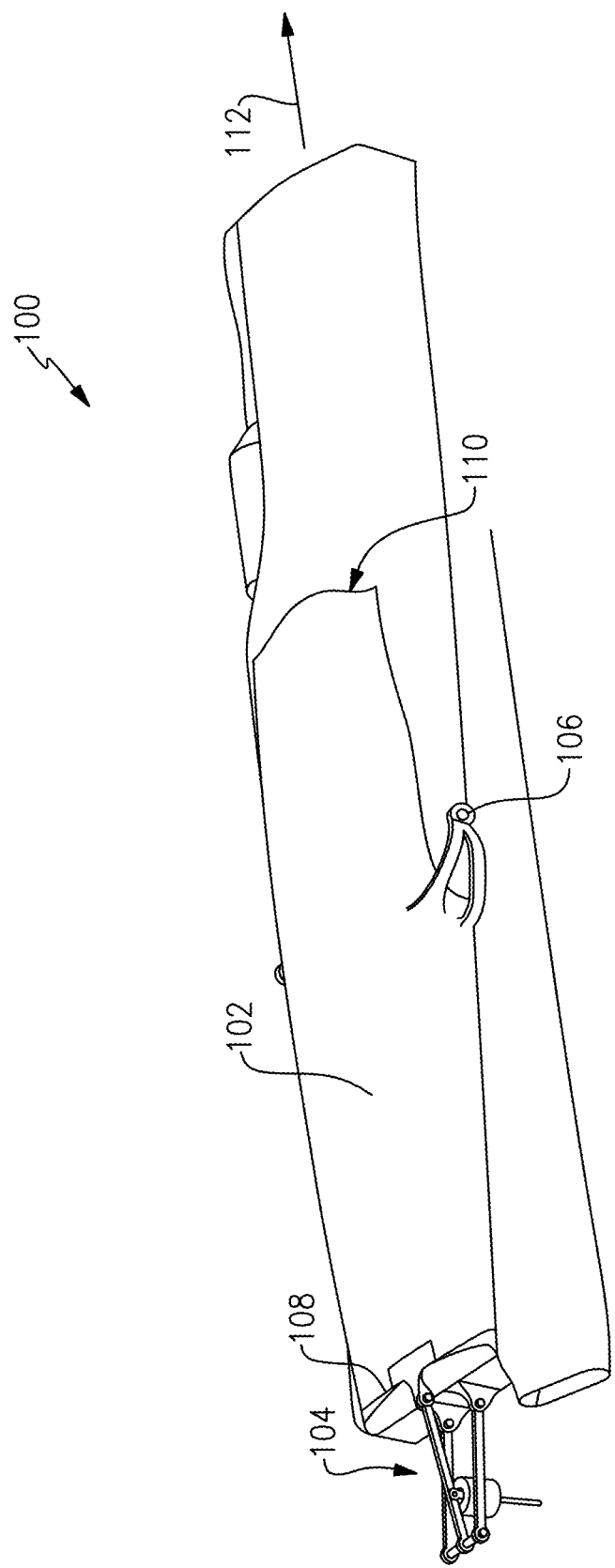
FIG. 6 is an external view of a portion of the thrust reverser system in the closed position.

Referring to FIGS. 4, 5 and 6, the example thrust reverser system 100 includes a plurality of reverser doors 102 that correspond with a circumferential location of one of the plurality of condensers 88. The thrust reverser system 100 is shown in a closed position in FIGS. 4, 5 and 6. In the closed position, cooling air flow 82 is routed through an inlet duct 84 radially outward through a corresponding condenser 88 from the inlet face 92 to the outlet face 94. The outlet flow 112 is then turned axially aft by the reverser door 102 through an outlet duct 86. Accordingly, each of the reverser doors 102 define a radially outer portion of a corresponding one of the cooling air outlet ducts 86. The outlet flow 112 is exhausted through an aft portion of the propulsion system 20 there it mixes with the bypass flow 48 (FIG. 4).

Each of the plurality of reverser doors 102 includes a forward side 108 and an aft side 110. The doors 102 are movable about a pivot 106 between the closed position shown in FIGS. 4, 5 and 6 and an open position as shown in FIG. 1. An actuator 104 is provided at the front side 108 of each of the doors 102. In one example embodiment, the actuators 104 is a bolt and screw actuator. Other actuator configurations and assemblies may be utilized and are within the contemplation and scope of this disclosure. The actuators 104 are configured to move the doors about the pivot 106 between the open and closed positions. Moreover, the actuators 104 may be operated to move the doors to any position between the open and closed position to tailor reverser thrust.

The doors 102 are mounted for movement about the pivot 106 such that the aft side 110 moves radially inward while the forward side 108 moves radially outward. A spacing 118 (FIG. 5) between the aft side 110 and the pivot 106 provides for the radially inward movement of the aft side 110 when the door 102 is moved to an open position.

Figure 7:
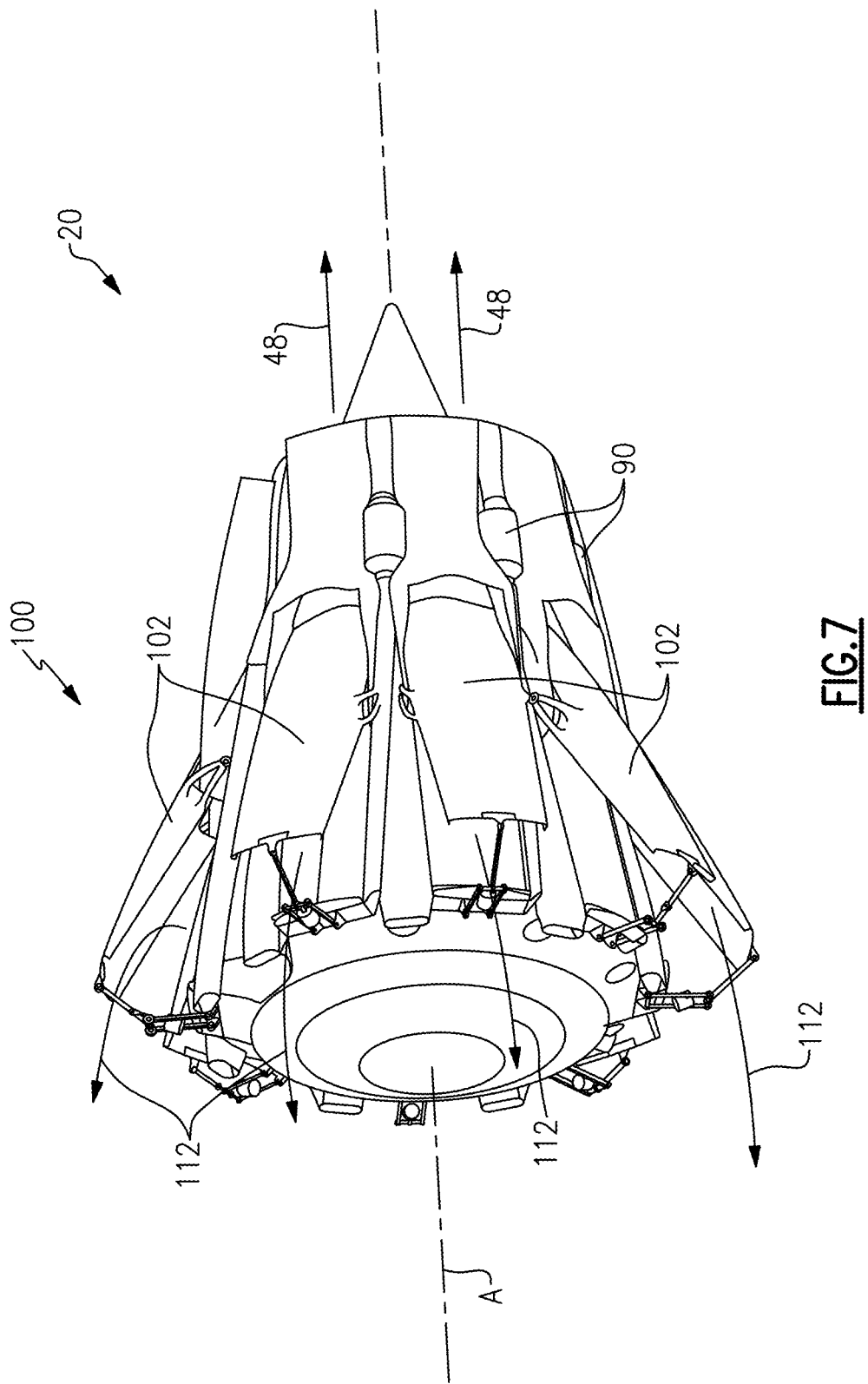
FIG. 7 is a perspective view of the example propulsion system with the thrust reverser system in an open position.
Figure 8:
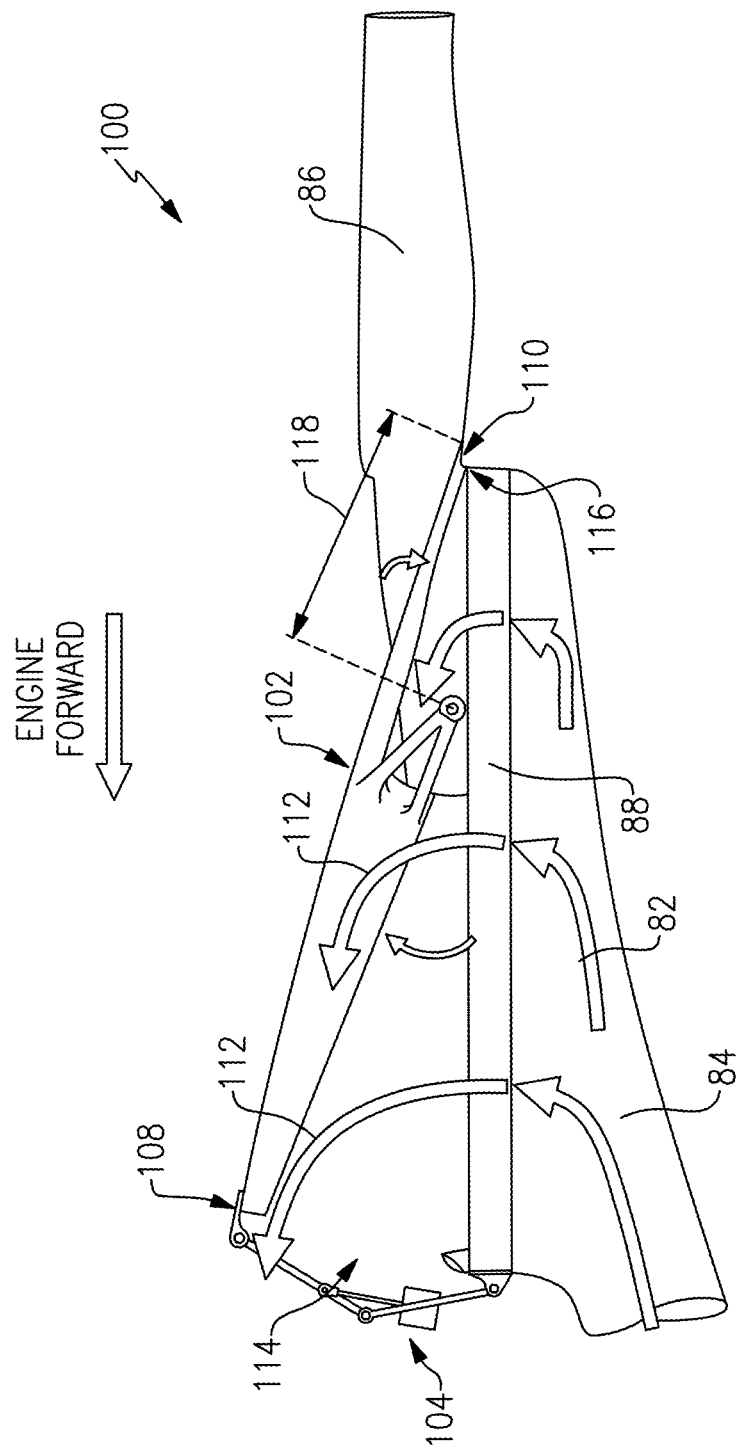
FIG. 8 is a cross-sectional view of a portion of the thrust reverser system in the open position.
Figure 9:
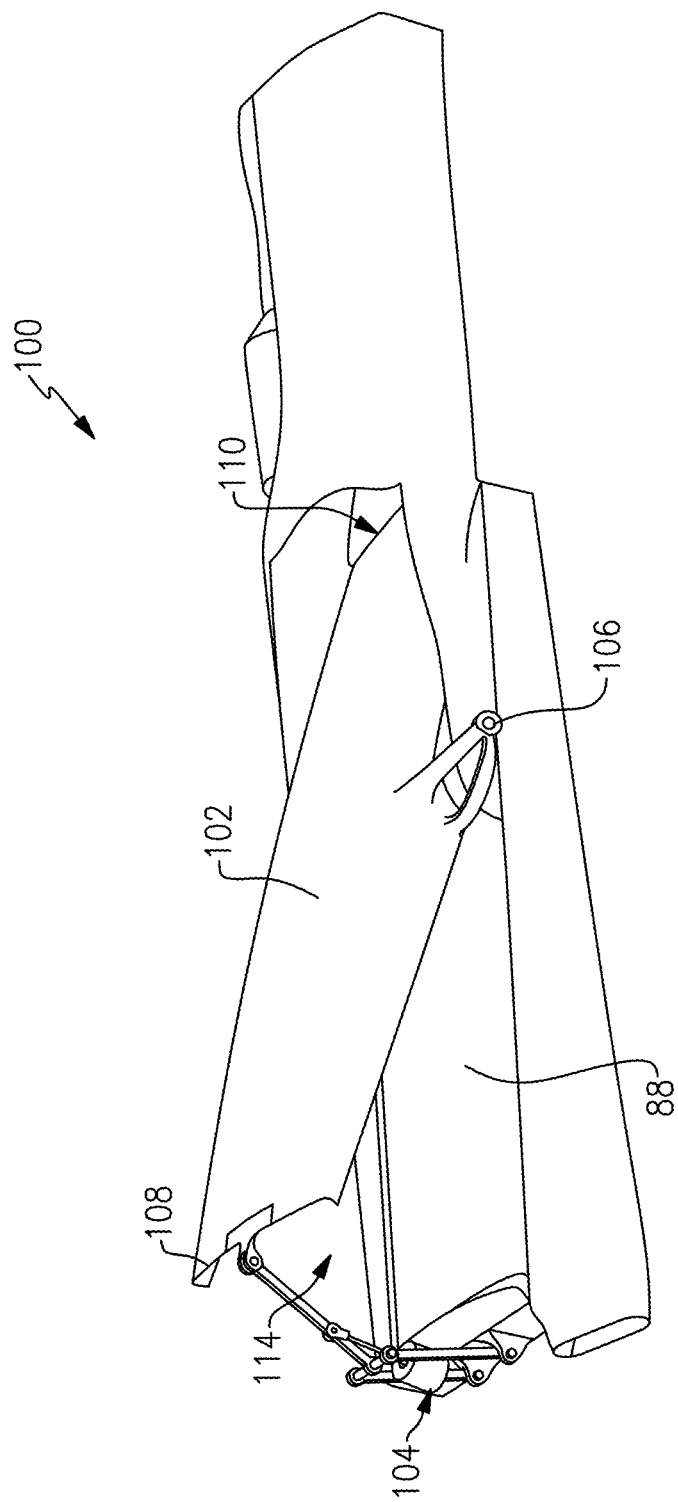
FIG. 9 is an external view of a portion of the thrust reverser system in the open position.

Referring to FIGS. 7, 8 and 9, the example thrust reverser system 100 is shown in an open position where the doors 102 cooling air flow 112 is directed engine forward. The example propulsion system 20 is shown with all of the doors 102 in the open position. The doors 102 are spaced apart circumferentially about the propulsor axis A. In the open position, the forward side 108 of each of the doors 102 extend radially outward to define forward facing opening 114. The opening 114 is defined between the condenser 88 and the forward side 108 of each of the doors 102.

The aft side 110 of each door 102 is pivoted radially inward into contact with a rear edge of the condenser 88 at an interface 116. The aft side 110 engages the condenser 88 at the interface 116 to close off cooling air flow 112 into the outlet duct 86. The radially flowing cooling airflow 112 is directed axially forward by the inner surface of each of the doors 102. Because the exhausted cooling airflow 112 is already turned radially outward, additional ducting is not necessary. The door 102 is configured to turn the exhausted airflow 112 from the radially outward direction either radially forward when in the open position (FIGS. 7, 8 and 9) or radially aft when in the closed position (FIGS. 4, 5 and 6).

The example thrust reverser system 100 turns only the airflow through the condensers 88 forward. Because a substantial portion of the airflow is routed through the condensers 88, the magnitude of reversing thrust is significant. In one disclosed example, the bypass flow 48 is allowed to simply be exhausted through the nozzle of the propulsion system 20.

Figure 10:
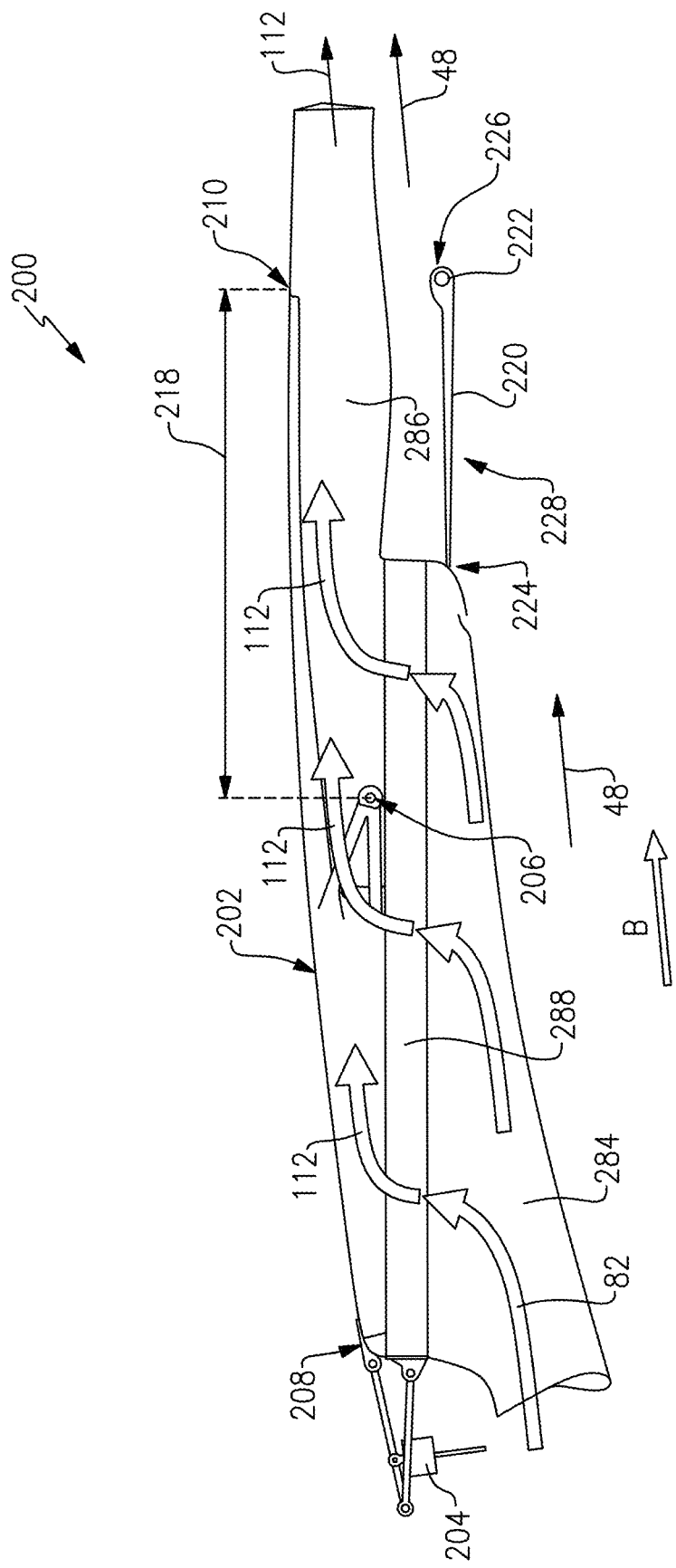
FIG. 10 is a cross-sectional view of a portion another example thrust reverser system embodiment in a closed position.
Figure 11:
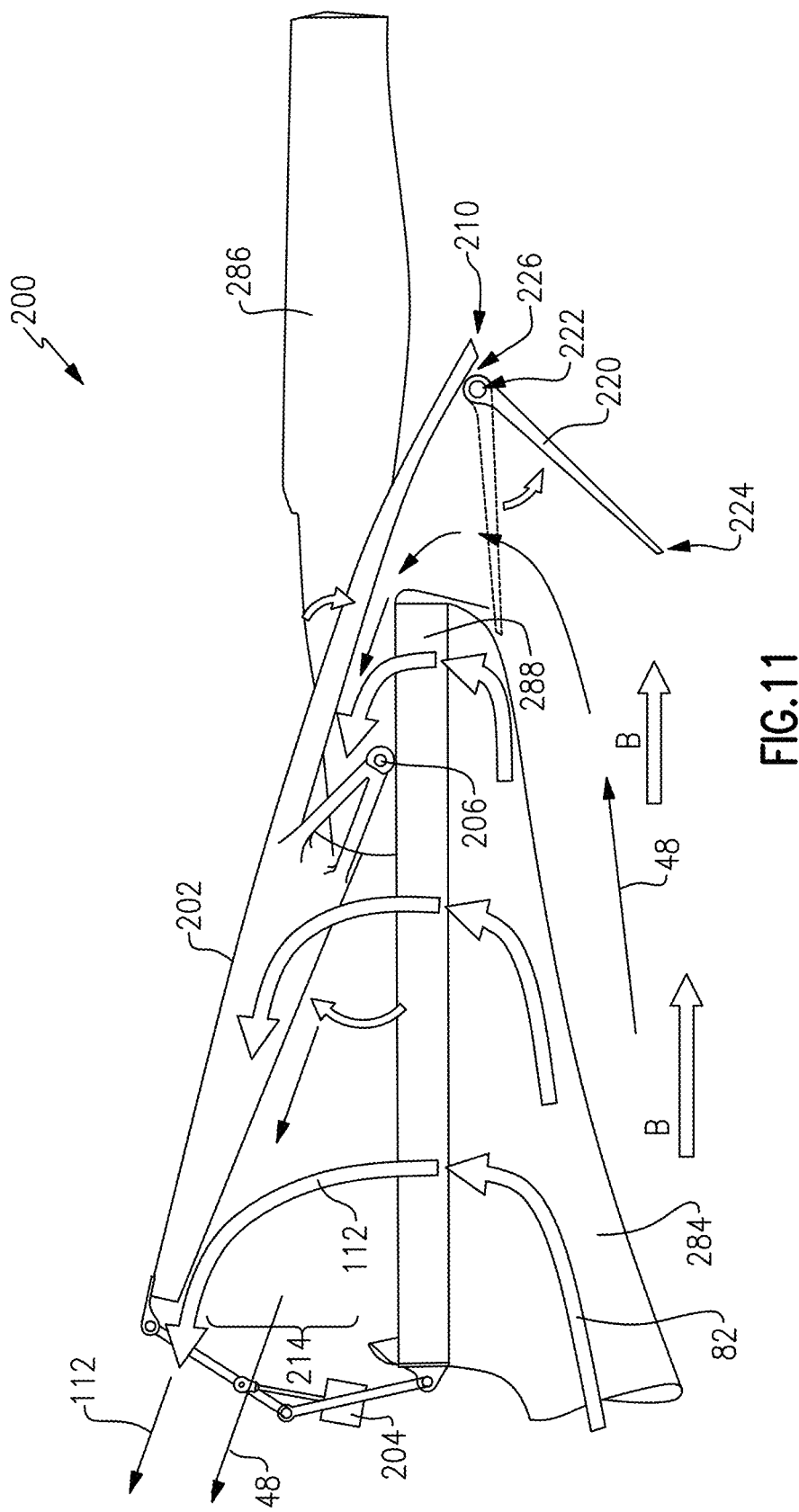
FIG. 11 a cross-sectional view of a portion another example thrust reverser system embodiment in an open position.

Referring to FIGS. 10 and 11, a portion of another example thrust reverser system 200 is schematically shown and includes an extended door 202 and an inner duct door 220 to capture and turn a portion of the bypass flow 48 forward. The door 202 is supported for movement about a pivot 206 and with an actuator 204.

The inner duct door 220 includes a forward end 224 and an aft end 226 and is supported for movement about an inner pivot 222. In the closed position shown in FIG. 10, the inner duct door 220 forms a radially outer portion of a bypass duct for directing the bypass flow 48 axially through the engine. The forward end 224 abuts a portion of the duct 284 for the cooling air flow 112 to form a substantially a radially outer surface 228 of the bypass duct.

The door 202 includes a forward end portion 208 and an aft end portion 210. The forward end portion 208 is in the same location as previously explained embodiments. The aft end portion 210 is spaced from the pivot 206 a distance 218. The distance 218 is set such that upon rotation of the door 202 about the pivot 206, the aft end portion 210 extends radially inward to abut the aft end 226 of the inner duct door 220.

In one disclosed embodiment, the aft end portion 210 abuts the aft end 226 near the pivot 222. The combination of the inner duct door 220 and the door 202 forms a passage that directs bypass flow 48 radially outward around the condenser 288 and then axially forward. The axially forward directed bypass flow combines with the cooling air flow 112 directed forward to generate a thrust opposing forward movement.

As is shown in FIG. 11, opening of the door 202 moves the aft end portion 210 radially inward of an end of the condenser 288 into abutting contact with an end of the inner duct door 220. The portion of the door 202 that is within the bypass passage B works with the inner duct door 220 to capture and redirect a portion of the bypass flow 48 radially outward and axially forward. Accordingly, the bypass flow 48 mixes with the exhausted cooling airflow 112 and is expelled forward to generate reversing thrust. The condenser 288 and the outlet duct 286 is configured to redirect the bypass flow 48 radially outward. The door 202 and the inner duct door 220 than direct both the exhausted cooling air flow 112 and the bypass flow 48 axially forward.

Accordingly, the example thrust reverser embodiments 100, 200 provide for the use of the significant amounts of airflow routed through the condensers 88, 288 to generate reverse thrust forces.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
   a core engine comprising a compressor, combustor, and turbine section, wherein an inlet airflow is compressed and communicated to the combustor, mixed with fuel, and ignited to generate an exhaust gas flow that is expanded through the turbine section;
   a fan driven about a propulsor axis by the core engine;
   a nacelle assembly;
   a condenser assembly where water is condensed from the exhaust gas flow generated by the core engine, the condenser assembly comprises a condenser arranged in the nacelle and a corresponding cooling air outlet duct where inlet air is directed for cooling the exhaust gas flow;
   an evaporator system where heat from the exhaust gas flow is used to transform water from the condenser assembly into a steam flow for injection into the core engine; and
   a thrust reverser assembly including a reverser door corresponding to the cooling air outlet duct for reversing a direction of the cooling air flow from the condenser forward.

2. The aircraft propulsion system as recited in claim 1, wherein the reverser door defines a radial outer portion of the cooling air outlet duct.

3. The aircraft propulsion system as recited in claim 1, wherein the reverser door comprises a forward portion, an aft portion, and a pivot positioned to provide for the aft portion to substantially close the cooling air outlet duct and move the forward portion radially outward to define a reverser opening.

4. The aircraft propulsion system as recited in claim 1, wherein the condenser includes an inlet face and an outlet face for the cooling air flow and an inlet flow path through the condenser is transverse to the propulsor axis and an outlet flow path through the cooling air outlet duct is perpendicular to the outlet face of the condenser.

5. The aircraft propulsion system as recited in claim 1, further comprising an actuator coupled to the reverser door for moving the reverser door from a closed position where the cooling air flows through the cooling air outlet duct and an open position where the cooling airflow is directed forward.

6. The aircraft propulsion system as recited in claim 1, wherein the reverser door is circumferentially aligned the condenser.

7. The aircraft propulsion system as recited in claim 1, further comprising an inner duct door corresponding to the cooling air outlet duct, wherein the inner duct door is movable to direct a portion of a bypass air flow radially outward and wherein a portion of the reverser door extends radially inward of the condenser outlet duct into a bypass passage and against a portion of the inner duct door for redirecting at least a portion of a bypass airflow forward along with the exhaust gas flow.

8. The aircraft propulsion system as recited in claim 1, including a cooling air duct assembly where a portion of inlet airflow is communicated to the condenser.

9. The aircraft propulsion system as recited in claim 1, further comprising a water separator where water from the condenser is separated from the exhaust gas flow.

10. The aircraft propulsion system as recited in claim 1, wherein the turbine section of the core engine is engine forward of the combustor and the compressor section and an inlet duct assembly communicates a portion of the inlet airflow to an inlet that is disposed aft of the compressor section.

11. The aircraft propulsion system as recited in claim 10, further comprising a power turbine coupled to drive the propulsor, the power turbine disposed engine forward of the core engine.

12. A gas turbine engine comprising:
a core engine comprising a compressor, combustor, and turbine section, wherein an inlet airflow is compressed and communicated to the combustor, mixed with fuel, and ignited to generate an exhaust gas flow that is expanded through the turbine section;
a fan driven about a propulsor axis by the core engine;
a nacelle assembly;
a fan case disposed within the nacelle assembly at least partially surrounding the fan;
a condenser assembly where water is condensed from the exhaust gas flow generated by the core engine, the condenser assembly comprises a condensers arranged in the nacelle, a corresponding condenser outlet duct, and a water separators where water from the condenser assembly is separated from the exhaust gas flow;
an inlet duct defining a flow path for the exhaust gas flow to the condenser;
an evaporator system where heat from the exhaust gas flow is used to transform water from the condenser assembly into a steam flow for injection into the core engine;
a bypass passage including a portion radially inward of the condenser outlet ducts; and
a thrust reverser assembly including a reverser door corresponding to the condenser outlet duct for reversing a direction of a cooling air flow from the condenser forward.

13. The gas turbine engine as recited in claim 12, wherein the reverser door defines a radial outer portion of the condenser outlet duct and comprises a forward portion, an aft portion, and a pivot positioned to provide for the aft portion to substantially close the condenser outlet duct and move the forward portion radially outward to define a reverser opening.

14. The gas turbine engine as recited in claim 13, wherein the condenser includes an inlet face and an outlet face for the exhaust gas flow and an inlet flow path through the condenser is transverse to the propulsor axis and an outlet flow path through the condenser outlet duct is perpendicular to the outlet face of the condenser.

15. The gas turbine engine as recited in claim 12, wherein at least one heat exchanger stage comprises a first stage and a second stage, and the first stage is downstream from the second stage relative to the exhaust gas flow from the core engine.

16. The gas turbine engine as recited in claim 12, further comprising an inner duct door movable to direct a portion of a bypass air flow radially outward and wherein a portion of the reverser door extends radially inward of the condenser outlet duct into the bypass passage such that the inner duct door and the reverser door define a passage for redirecting at least a portion of a bypass airflow along with the exhaust gas flow.

17. The gas turbine engine as recited in claim 12, further comprising an intercooling system where a portion of the water extracted from the exhaust gas flow is utilized to cool a portion of a core airflow.

18. A method of operating an aircraft propulsion system comprising:
generating an exhaust gas flow with a core engine including a compressor, combustor, and turbine section;
coupling a propulsor to a power turbine configured to be driven by expansion of the exhaust gas flow about a propulsor axis by the core engine;
condensing water in condenser assembly by cooling a portion of the exhaust gas flow with a cooling air flow with a condenser arranged about the propulsor axis;
heating water from the condenser assembly in an evaporator system with at least one heat exchanger stage mounted to a fan case at least partially surrounding a fan coupled to the core engine;
communicating the generated steam flow to the core engine; and
selectively directing a portion of the cooling airflow exiting the condenser with a reverser door.

19. The method as recited in claim 18, wherein the reverser door comprises a forward portion, an aft portion, and a pivot positioned to provide for the aft portion to substantially close a condenser outlet ducts and move the forward portion radially outward to define a reverser opening and further comprising directing the cooling air flow from the condenser forward.

20. The method as recited in claim 18, wherein a portion of the reverser door extends radially inward of the condenser outlet duct into a bypass passage and an inner duct door opens radially to define a passage for redirecting at least a portion of a bypass airflow along with the cooling air flow.

* * * * *